Feb. 16, 1965 W. W. KENNEDY Re. 25,729

DAMPER ASSEMBLY FOR AIR MIXERS

Original Filed March 16, 1961 3 Sheets-Sheet 1

INVENTOR
Walter W. Kennedy
By Wolfe, Hubbard, Vail & Dann
ATTORNEYS

Feb. 16, 1965

W. W. KENNEDY

Re. 25,729

DAMPER ASSEMBLY FOR AIR MIXERS

Original Filed March 16, 1961

3 Sheets-Sheet 2

INVENTOR
Walter W. Kennedy
By Wolfe, Hubbard, Vitt & Dawson
ATTORNEYS

DAMPER ASSEMBLY FOR AIR MIXERS

Original Filed March 16, 1961 3 Sheets-Sheet 3

INVENTOR
Walter W. Kennedy
By Wolfe, Hubbard, Vitt & Ocamb
ATTORNEYS

United States Patent Office

Re. 25,729
Reissued Feb. 16, 1965

25,729

DAMPER ASSEMBLY FOR AIR MIXERS

Walter W. Kennedy, Rockford, Ill., assignor to Barber-Colman Company, Rockford, Ill., a corporation of Illinois Original No. 3,123,097, dated Mar. 3, 1964, Ser. No. 96,208, Mar. 16, 1961. Application for reissue Apr. 27, 1964, Ser. No. 377,150
10 Claims. (Cl. 137—601)

Matter enclosed in heavy brackets [ ] appears in the original patent but forms no part of this reissue specification; matter printed in italics indicates the additions made by reissue.

This invention relates to a damper for regulating the flow of air or other gas through a duct and has more particular reference to a damper in which the air flow is controlled by expanding or contracting a cone or umbrella-like device to vary the radial width of an annular opening within the duct. A conical damper of this character forms the subject matter of Patent 3,070,346.

In such dampers, the cone is pointed downstream and, when of the proper angle and properly sized in relation to the duct, effects a substantially uniform distribution of the air across the entire downstream cross-section of the duct beyond the damper and through an adjacent discharge outlet even though the flow may be confined to a narrow radial width when the damper is only partially open. This desirable action is attributable to the negative pressure which develops beyond the cone and within the annular orifice and which draws part of the air stream inwardly along the converging surface of the cone. It has been found that such drawing of the air inwardly is limited to a certain size of cone.

The primary object of the present invention is to adapt a cone damper of the above character to ducts of larger size while maintaining even distribution of the air across the area of the duct beyond the cone.

A more detailed object is to divide the duct into a plurality of concentric annular orifices or passages and regulating the flows therethrough by separate cone dampers.

The invention also resides in the novel manner of mounting and actuating the several dampers in unison.

Other objects and advantages of the present invention will become apparent from the following detailed description taken in connection with the accompanying drawings, in which—

Figures 3, 4, 5, 6:
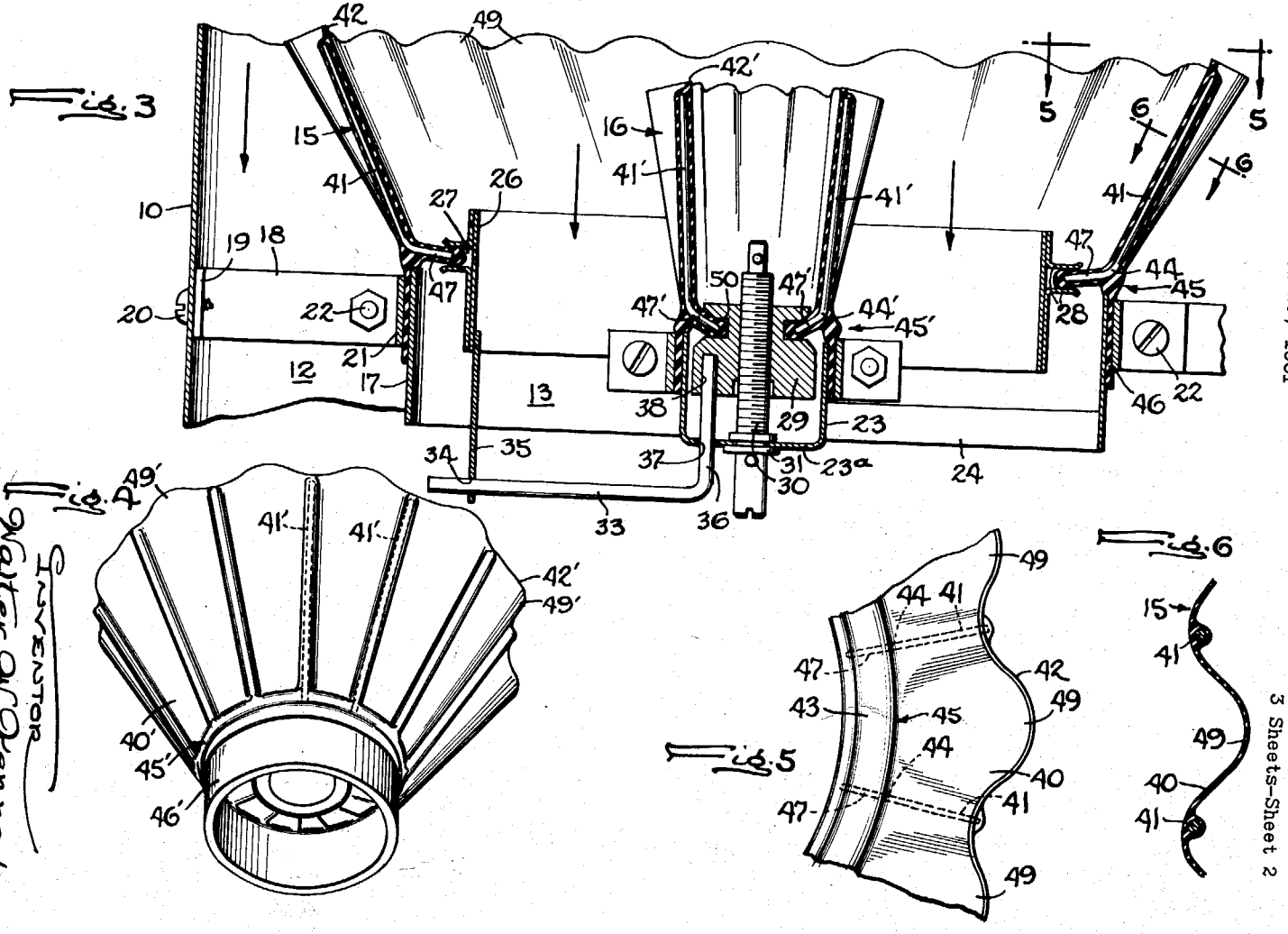
FIG. 3 is a fragmentary sectional view similar to FIG. 1 showing the damper fully opened.
FIG. 4 is a perspective view of the inner umbrella.

FIGS. 5 and 6 are sectional views taken respectively along the lines 5—5 and 6—6 in FIG. 3.

Figure 8:
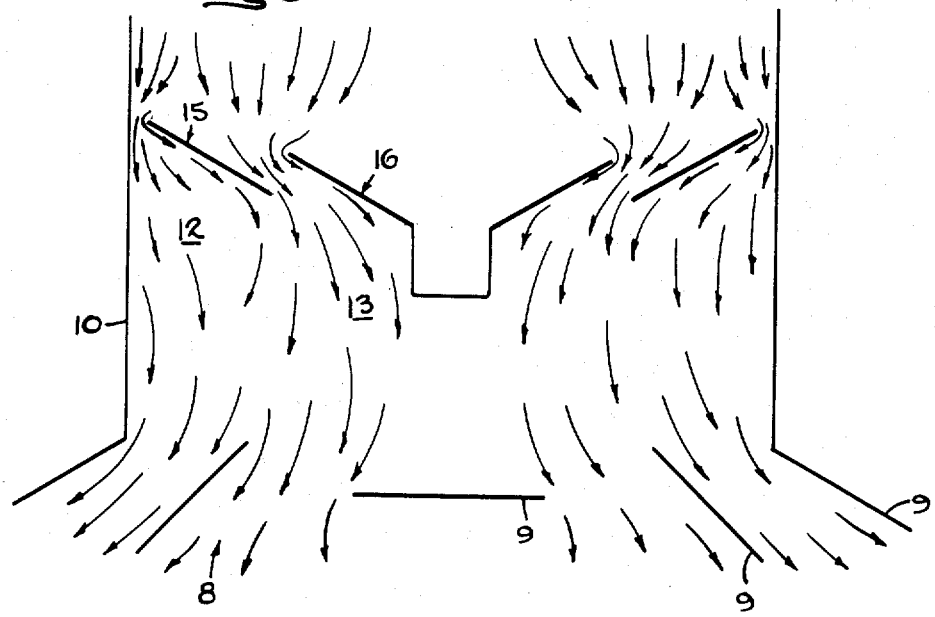
Figure 7:
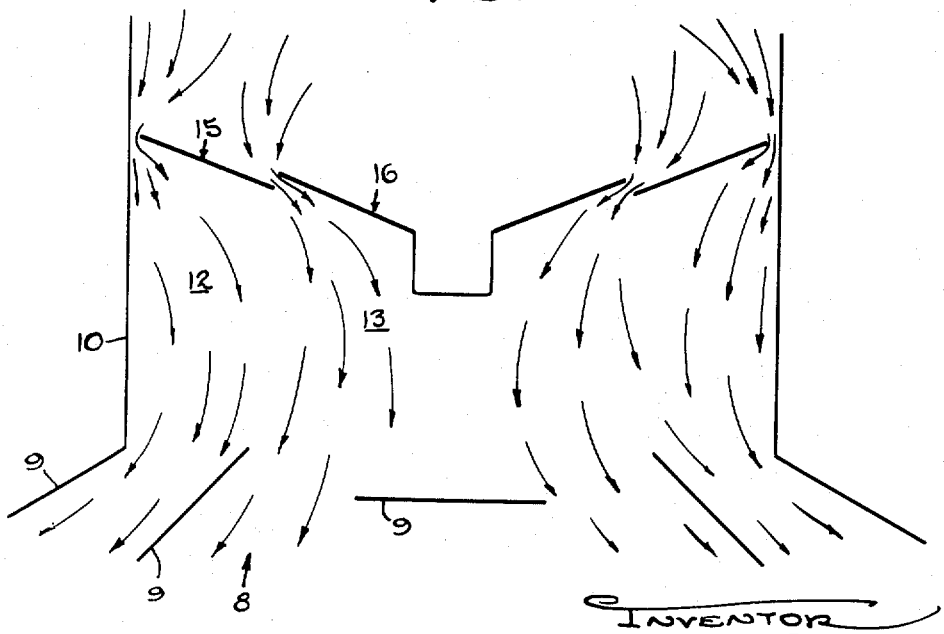

FIGS. 7 and 8 are diagrammatic views illustrating the distribution of air flow with the damper opened different degrees.

Figures 1, 2:
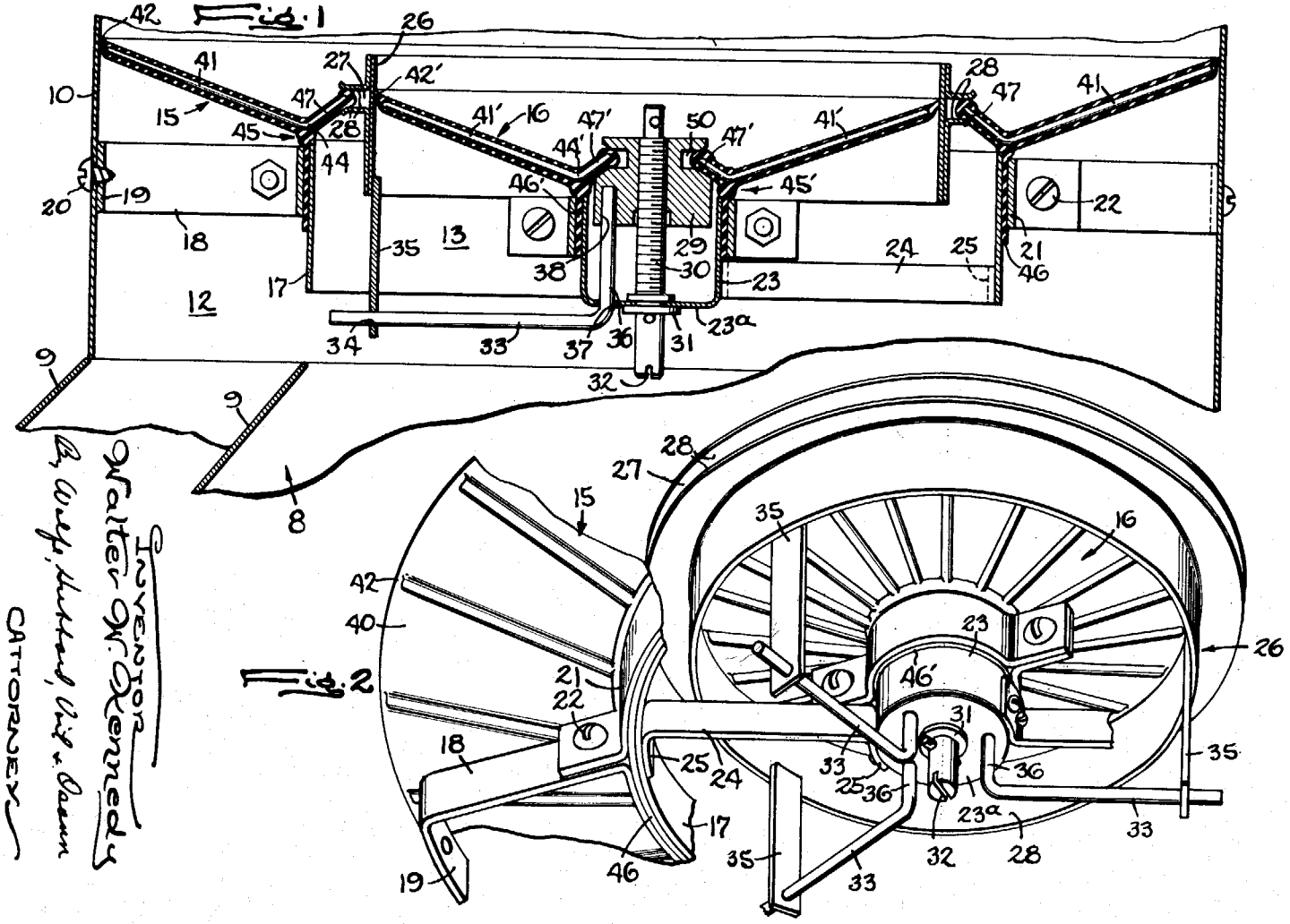
FIGURE 1 is a diametrical sectional view of an air duct and damper embodying the present invention, the parts being shown in closed positions.
FIG. 2 is a fragmentary perspective view looking toward the downstream end of the damper.

For controlling the flow of air through a duct 10 a damper embodying the invention is mounted within the duct which is divided into two or more concentric annular passages 12, 13 selectively variable in width to regulate the total flow of air past the damper and deliver the air through a suitable distribution outlet 8 herein shown as comprising a center disk and a series of concentric cones 9. Generally stated, the invention contemplates making the damper of two or more concentric elements 15, 16 each in the form of an expansible and collapsible truncated cone or umbrella and correlated in size and shape with the outer walls of the passages 12, 13. The common axis of the cones is coincident with the duct axis. By radially expanding or collapsing the cones, the passages 12, 13 may be closed tightly (FIG. 1) or partially opened to any desired degree (FIGS. 3, 7 and 8) for regulating the total flow of air through the duct in the direction indicated by the arrows. The apex of each cone or umbrella is directed downstream so that the pressure of the oncoming air on the upstream inner side of the cone elements assists in holding the cones open and assures a tight seal between the outer periphery of the cones and the adjacent duct wall when the damper is fully expanded (FIG. 1).

The outer passage 12 is defined by the duct wall 10 and a ring 17 of smaller diameter concentric with the axis of the duct and supported from the latter in an axially fixed position by angularly spaced spokes 18. After insertion of the damper in the duct, flanges 19 on the outer ends of the spokes are secured to the duct by screws 20. The inner ends of the spokes are rigid with a split collar 21 contracted by bolts 22 around the ring 17 which herein comprises a short length of metal tubing.

The inner wall of the inner passage 13 is defined by a tubular ring 23 substantially smaller than the tube 17 and axially fixed concentric with the latter by spokes 24. Flanges 25 at opposite ends of these spokes are welded or otherwise fixed to the downstream ends of the rings 17 and 23. For a purpose to appear later, the downstream end of the ring 23 is closed by a wall 23a thus forming a cylindrical cup which opens upstream. The outer wall of the inner passage 13 is defined by a tubular annulus 26 concentric with and somewhat smaller than the ring 17. Herein, the downstream end of the [ring] *annulus* is cylindrical while the other end is shaped to form an outwardly opening annular groove 27, this being defined by flanges 28 in the present instance. As will appear later, the space between the outer ring 17 and the annulus 26 is closed by the inner edge portion of the outer umbrella 15.

To provide for opening and closing of the outer umbrella, the annulus 26 is mounted for movement axially back and forth along the duct axis. Herein, this is accomplished by connection of the annulus with an actuator member 29 disposed within the cup 23 and itself mounted for axial movement relative thereto. For this purpose, the member takes the form of a generally cylindrical nut threaded onto a screw 30 which is journaled in the cup bottom 23a and axially fixed between a shoulder on the screw and a washer 31 pinned on the outer end of the screw. The latter projects from the cup in a direction downstream of the duct and is slotted as at 32 or otherwise shaped to receive a tool by which the screw may be turned to open and close the umbrella dampers.

The actuating member and the annulus 26 are joined rigidly by angularly spaced spokes in the form of L-shaped wires 33 whose long legs are disposed radially and project into holes 34 in bars 35 which parallel the duct axis and are welded to the cylindrical part of the annulus 26. The short legs 36 parallel the duct axis and project through holes 37 angularly spaced around the bottom 23a of the cup and pressed into alined holes 38 in the end of the nut 29.

While the coned damper elements or umbrellas may take various forms, they are preferably formed as disclosed in the above mentioned application as a molded frusto-conical thin disk 40 of flexible rubber or other suitable plastic in which is embedded during the molding a plurality of angulary spaced wire ribs 41. Preferably, though not necessarily, the latter are completely covered by the rubber so as to provide continuous somewhat yieldable outer edges 42 adapted to come in full sealing engagement with the outer and inner duct walls 10 and 26 when the umbrellas 15 and 16 are fully expanded (FIG. 1). The ribs are generally L-shaped with their long and short legs disposed at a slightly obtuse angle. The short legs are also embedded in the rubber so that in the case of the outer umbrella 15, the intervening webs 43 of rubber close the radial space between the tube 17 and the annulus 26 and thus separate the inner and outer duct passages 12 and 13.

At the bends 44 in the ribs, the latter are supported to swing about individual axes disposed substantially tangent to the upstream end of the tube 17 and thus provide for opening and closing of the umbrella. While various fulcrums may be employed, the hinges indicated at 45 are formed in the present instance by the rubber at the junctions of the inner edges of the umbrella and the end of a sleeve 46 molded integral with the umbrella at the heels 44 of the ribs and telescoped substantially throughout its length around the tube 17. The sleeve is clamped to the tube by the split collar 21.

The rubber covered inner ends 47 of the ribs 41 project loosely into the outwardly opening groove 27 in the annulus 26 which groove is shaped to accommodate the full range of axial shifting of the annulus required for fully opening and closing the umbrella as shown in FIGS. 1 and 3. In the closing movement from the open position shown in FIG. 1, the rubber webs between each pair of adjacent ribs bend inwardly and form folds 49 as shown in FIGS. 3, 5 and 6.

The inner umbrella 16 is constructed and mounted in the same way and the parts thereof corresponding to those of the outer umbrella are indicated by the same but primed numbers. In this instance, the inner ends 47' of the ribs 41' project into an outwardly opening groove 50 formed in the upstream end of the nut 29 beyond the lip of the cup 23.

When mounted as above described, it will be apparent that in response to turning of the screw 30 in opposite directions, the nut 29 and the annulus 26 rigid therewith will move in unison and axially in corresponding directions. Both umbrellas are correspondingly expanded and collapsed thus correspondingly varying the radial widths of the inner and outer passages 12 and 13 therefore the total rate of air flow past the damper. The arrangement is such that the outer peripheries 42 and 42' of the umbrellas come into engagement with the duct walls 10 and 26 simultaneously as shown in FIG. 1. In the present instance, the short legs of the ribs 41' of the inner umbrella are somewhat shorter than the short legs of the outer umbrella so that the ribs 41' swing through a correspondingly greater angle in the movement of the nut through its full range.

The double coned damper constructed as described above is well suited for use in ducts ranging from about 8 to 16 inches in diameter. In [the larger of] such ducts, the umbrellas 15 and 16 are disposed at [an] *a cone* angle of about 20 degrees *relative to a plane normal* to the duct axis when fully expanded (FIG. 1) against the long and short outer walls 10 and 26 of the two duct passages 12 and 13. As the dampers start to open and the cone angle is increased to about 23 degrees as shown in FIG. 7, the air flows past the outer edges of the umbrellas in two radially spaced streams and such division alone effects a desirable distribution of the flow radially across the duct 10. There is some bending of these streams, especially the inner one, inwardly to follow the downstream surface of the cones, this being illustrated by the arrows in FIG. 7.

As the cones are [expanded] *contracted* further and reach an angle of about 30 degrees as shown in FIG. 8, the negative pressures developed on the downstream sides of the cones becomes substantially more effective in bending the annular streams inwardly. Thus, the radial widths of the streams are increased as illustrated by the arrows in FIG. 8, substantially the entire cross-sectional area of the duct 10 being covered by the two expanding streams by the time the air reaches the discharge outlet 8 even though the latter is located quite close to the damper as is desirable in most installations. Such expanding of air streams under the developed negative pressures increases as the cone angles of the umbrellas are further increased so that over the major part of the opening range, the total air flow is distributed substantially uniformly over the entire area of the discharge outlet.

For ducts up to about 8 inches in diameter, it has been found that such even air distribution may be achieved with only one umbrella. For ducts larger than about 16 inches, it may be desirable to divide the cross-section into more than two parts as described above and provide additional umbrellas. In general, the number of such divisions is determined by the duct size and is such that the maximum radial width of each annular passage does not exceed about 4 inches. In such cases, full closure of the duct is achieved without expanding the umbrellas very far beyond a 30 degree cone angle which is about the minimum capable of effectually producing the desired inward bending of the air streams passing through the respective annular orifies.

I claim as my invention:

1. The combination of, an elongated outer wall, a ring smaller than said wall and fixedly mounted within said wall concentric with the latter and cooperating therewith to define an outer annular air passage, an annulus shorter than said wall and smaller than said ring and mounted concentric with the latter for axial shifting, a second smaller ring rigid with said wall and said first ring and cooperating with said annulus to form an inner annular air passage concentric with said outer passage, a member rigid with said annulus and mounted within said second ring for movement back and forth along the axis of said rings, a frusto-conical umbrella disposed in said outer air passage and radially expansible and contractible to vary the width of said outer passage and thereby control the flow of air therethrough, a similar smaller umbrella disposed in said inner passage and radially expansible and contractible to control the flow of air therethrough, the peripheral shapes of said umbrellas corresponding to said wall and annulus so as to close the passages when the umbrellas are expanded against the wall and annulus, and actuating means for moving said member and said annulus back and forth axially relative to said rings to open and close both of said umbrellas in unison.

2. The combination defined in claim 1 in which the outer peripheries of said umbrellas engage said wall and annulus substantially simultaneously and thereby close both of said passages.

3. The combination defined in claim 1 including a plurality of angularly spaced spokes rigidly joining said wall [,said annulus] and said [second] *first* ring, and a plurality of angularly spaced spokes rigidly joining said first and second rings.

4. The combination defined in claim 1 including a plurality of angularly spaced spokes rigidly joining said first and second rings.

5. The combination defined in claim 4 including screw and nut elements one formed by said member and relatively rotatable to shift said member and said second ring axially relative to each other and thereby open and close both of said umbrellas.

6. The combination as defined in claim 1 in which the cone angles of said inner and outer umbrellas are substantially equal.

7. The combination as defined in claim 1 in which the cone angles of said inner and outer umbrellas are [within a range of between 10 and] *approximately* 20 degrees when the umbrellas are fully expanded against said wall, said angles increasing progressively during closing of the umbrellas.

8. The combination as defined in claim 1 in which said inner and outer umbrellas include angularly spaced ribs of generally L-shaped fulcrumed at the heels of the L's on said first and second rings to swing in radial planes, and means coupling the inner ends of all of said ribs to said member.

9. The combination of, an elongated outer wall defining an air duct, an axially fixed ring smaller than said wall and fixedly mounted within said wall concentric with the latter and cooperating therewith to define an outer annular air passage, an axially shiftable annulus shorter than said wall and smaller than said ring, a second axially fixed ring smaller than and concentric with said annulus and cooperating therewith to form an inner air passage, a member mounted within said second ring for movement back and forth along the axis of said rings, a frustoconical umbrella disposed in said outer air passage, means on said first ring supporting said umbrella for radial expansion and contraction to control the flow of air through the outer passage, a similar smaller umbrella disposed in said inner passage, means on said second ring supporting said second umbrella for radial expansion and contraction to control the flow of air through the inner passage, the outer edges of said umbrellas being shaped to contact said wall and annulus around the entire peripheries thereof and thereby close both of said passages when the umbrellas are fully opened and means for moving said member and said annulus back and forth axially to open and close both of said umbrellas in unison.

10. The combination defined in claim 1 in which said outer and inner umbrellas include angularly spaced radially disposed ribs respectively fulcrumed adjacent their inner ends on said first and second rings to swing about fixed axes extending tangentially of said rings.

References Cited by the Examiner

The following references, cited by the Examiner, are of record in the patented file of this patent or the original patent.

UNITED STATES PATENTS 2,881,687 4/59 Manor ---------- 98—1

WILLIAM F. O'DEA, *Primary Examiner.*